Patented Aug. 10, 1943

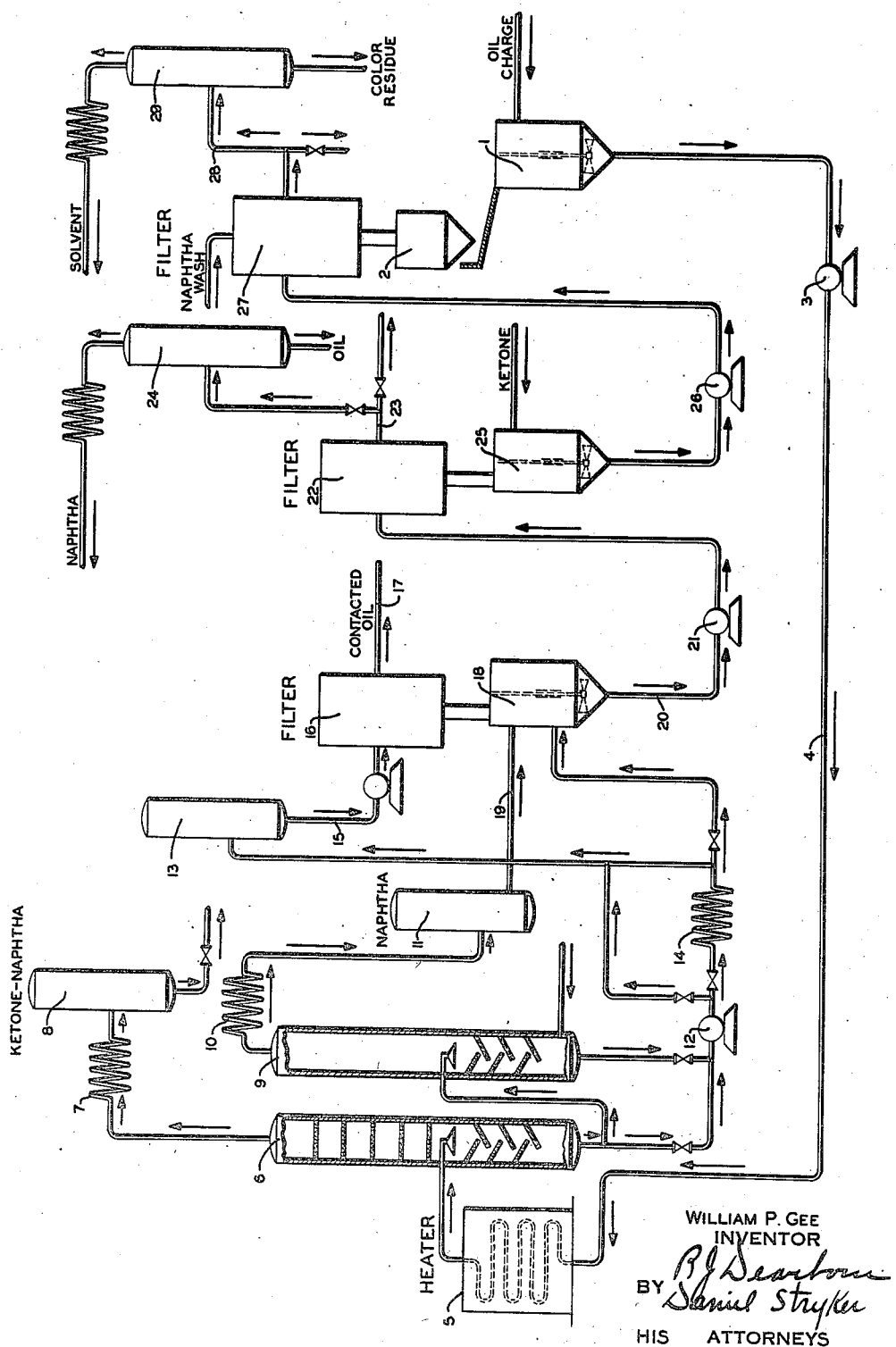

2,326,295

UNITED STATES PATENT OFFICE 2,326,295

PROCESS FOR DECOLORIZING OIL WITH DECOLORIZING EARTH IN THE PRESENCE OF NAPHTHA

William P. Gee, Plainfield, N. J., assignor, by mesne assignments, to The Texas Company, New York, N. Y., a corporation of Delaware Application December 2, 1939, Serial No. 307,226

4 Claims. (Cl. 196—34)

This invention relates to recovering and revivifying adsorbent materials used in treating hydrocarbon oils.

The invention broadly contemplates a process of removing coloring matter, oil, and other bodies adhering to or retained in solid decolorizing materials used in the treatment of hydrocarbon oils in order to revivify the decolorizing material substantially to its original decolorizing efficiency. More particularly, it concerns the removal of coloring matter and other impurities from earth or clay materials used in the treatment of oils such as derived from petroleum. The earth or clay materials in question may comprise fuller's earth, activated clays, acid-treated clays, or other silicious materials such as magnesium silicates, for example. It is contemplated that the process is applicable to other types of adsorbent materials which are used to remove coloring matter from oils by adsorption.

In accordance with the invention, the used adsorbent material containing coloring matter, as well as other impurities, including some oil adsorbed during contact with hydrocarbon oil, is treated with a solvent, such as petroleum naphtha, capable of dissolving the retained oil. The solvent and dissolved oil are removed, leaving a substantially oil-free or deoiled adsorbent material. The de-oiled material is then treated with a solvent, such as an aliphatic ketone, adapted to dissolve or displace the retained coloring matter. The solvent and dissolved matter are removed and the adsorbent material is then washed with a further quantity of solvent, such as naphtha, to remove or displace the retained color-removal solvent.

The invention is particularly applicable to the treatment of decolorizing clay such as used in the conventional clay contact treatment of mineral lubricating oils. The used clay contains a substantial amount of coloring matter and also retains a substantial amount of oil; for example, the spent or used clay may contain around 40 or 60% of oil by weight of the clay. It is therefore desirable to deoil the clay as a preliminary to solvent extraction for the removal of the coloring matter. The present invention contemplates a continuous process for deoiling and extraction of the coloring matter from the clay in order to revivify and recondition the clay for reuse.

An advantage of the invention is to accomplish this without subjecting the contact clay to excessive mechanical handling, since such handling results in injury to, and destruction of, the particle structure of the clay, which is particularly objectionable where the clay or earth is of a fragile nature.

A further advantage of the invention is the utilization of a closed continuous system adapted to reduce solvent losses and to effect recovery and revivification of the clay to a higher degree than heretofore and in a more effective manner.

The present application is a continuation-in-part of my pending application, S. N. 296,568, filed September 26, 1939, for improvements in Recovering and revivifying adsorbent materials.

In the aforesaid pending application, as illustrated, for example, in Fig. 2 of the drawing thereof, I disclosed a process of employing the recovering and reconditioning of the clay in direct conjunction with the treatment of lubricating oil stock. As there disclosed, the lubricating oil stock was subjected to contact at elevated temperature with reconditioned clay. Since the reconditioned clay retained some solvent, both color-removal solvent and naphtha or oil solvent, the hot mixture of oil and reconditioned clay was subjected to evaporation so as to remove these retained solvents. Subsequently, the mixture of oil and clay was subjected to filtration to remove the clay. Following this, the clay was subjected to treatment with solvents, as described above, in order to remove retained oil and coloring matter.

The present application has to do with a modification of the recovery process disclosed in the aforesaid application and which provides for the separate removal in dry form of the ketone or color-removal solvent from the hot mixture of feed oil and reconditioned clay.

In order to describe the invention more fully reference will now be made to the accompanying drawing, which comprises a flow diagram of the process of the invention.

Referring to the drawing, lubricating oil stock, such as a solvent-extracted oil, is conducted from a source not shown and introduced to a mechanically-agitated tank 1. Into this tank also flows naphtha-laden recovered fine clay from a hopper or tank 2. The flow of charge oil is so regulated that the proper proportion of decolorizing clay to oil is obtained in this tank. The amount of clay so added may be in the range of about five pounds to sixty pounds of dry clay per barrel of oil (42 gallons).

The resulting mixture is pumped by a pump 3 through a pipe 4 to a heater 5 wherein the temperature is raised to the proper degree for contacting. This temperature may be of the order of 400 to 500° F., for example, when a high viscosity oil, such as a cylinder stock, is being treated.

The hot oil and clay mixture from the heater 5 flows into an evaporating and fractionating tower 6. The lower portion of the tower provides an evaporating zone wherein ketone or color-removal solvent is flash-evaporated. The vaporized solvent is subjected to fractionation in the upper portion of the tower 6 so as to produce a distillate comprising essentially water-free ketone, with a portion of naphtha, which is withdrawn through a condenser 7 and discharged into a tank 8.

The lower portion of the tower 6 is provided with inclined baffles, as shown, over which the clay-oil mixture passes so as to facilitate evaporation of the solvent and to avoid settling out of the clay from the oil.

The clay-oil mixture from which the ketone has been removed is withdrawn from the bottom of the tower 6 and introduced to an evaporator 9. The evaporator 9 is likewise provided with inclined baffles to facilitate complete evaporation of remaining solvent and which comprises naphtha.

The naphtha distillate is drawn off through a condenser 10 to a storage tank 11.

The clay and oil mixture is now drawn off from the bottom of the evaporator 9 by a pump 12 and conducted to a tank 13. All or a portion of it may be passed through a cooler 14, depending upon whether or not it is desired to adjust the temperature of the mixture.

From the tank 13 the clay-oil mixture is charged through a pipe 15 to a filter 16.

The filter 16 may be a totally-enclosed, continuous drum type filter with or without provision for employing a precoat, although the latter is advantageous where the mixture of clay and oil being charged does not contain a diluent.

The oil is separated from the clay in the form of a filtrate which is discharged through a pipe 17 and this filtrate comprises the treated decolorized oil. The clay is separated in the form of a filter cake and is discharged from the filter to a tank 18.

In the tank 18 the spent clay containing around 40 to 60% of oil is mixed with petroleum naphtha introduced to the tank through a pipe 19. The naphtha and clay are introduced to the tank so as to form a mixture containing about 10 to 20% of clay by weight.

The resulting mixture is fed continuously through a pipe 20 and pump 21 to a continuous drum type totally-enclosed vacuum filter 22. The filter is advantageously equipped with a paddle agitator in the bottom of the filter tank and under the filter drum.

The filtering operation is preferably conducted at temperatures below 130° F. in order to avoid excessive evaporation of naphtha in the vacuum system. Also, the filter drum is operated with a submergence of about 40%.

The filtrate is drawn off through a pipe 23 and comprises naphtha containing dissolved oil which has been removed from the clay. The filtrate may be conducted to a distilling column 24 wherein the naphtha is stripped from the oil as a distillate, or a portion recycled to form the mixture in tank 18.

The filter cake comprising deoiled clay is discharged from the filter 22 to a tank 25 wherein it is mixed with the color-removal solvent comprising an oxygen-containing carbon compound such as acetone or methyl ethyl ketone, or other low-boiling ketone.

The color-removal solvent may also comprise a mixture of ketone and petroleum naphtha. A suitable mixture, for example, may contain around 10 to 30% by volume of ketone. The solvent is mixed with the clay in the tank to form a mixture containing about 15 to 30% by weight of clay. The mixing is advantageously effected at a temperature above normal, for example, around 120 to 130° F.

The resulting mixture of color-removal solvent and deoiled clay is drawn off from the tank 25 by a pump 26 and conducted to a continuous vacuum drum type filter 27 where the solvent and dissolved coloring matter is separated from the clay.

The filtrate comprising solvent and dissolved coloring matter is drawn off through a pipe 28 to a distilling column 29 wherein the solvent is distilled from the dissolved matter. If desired, the distilling column may have provision to effect fractionation between the components of the color-removal solvent. Thus, a distillate fraction may be removed from the top of the column comprising the total ketone and a portion of the naphtha, while a side stream is removed from the column comprising the remaining naphtha.

The filter cake comprising deoiled clay, and from which coloring matter has been removed, is washed in situ with naphtha to displace a substantial portion of the color-removal solvent still retained in the clay. This wash filtrate may be separately disposed of or may be conducted to the column 29.

The wash filter cake is then discharged from the filter to the hopper 2, previously referred to. This reconditioned clay still retains some ketone and naphtha. For example, the ketone content may be around 0.5% to 1.0% by weight of the clay, while the naphtha content may be around 50% to 60%.

From the hopper 2 this reconditioned clay is conducted to the tank 1 for mixing with fresh feed, as previously described.

While the contact filtration step described above in connection with filter 16 has been disclosed as being carried out in the absence of a diluent, it is contemplated, nevertheless, that a diluent may be used in the contact filtration, if desired. In such case, the clay-oil mixture from the evaporator 9, or even from the bottom of the evaporator 6, may be conducted, after suitable cooling, to the tank 18 wherein it is mixed with the necessary quantity of naphtha from the tank 11. The diluted mixture is then charged to the filter 22. In this case the decolorized oil is obtained from filter 22 while the filter 16 is by-passed.

With this type of operation the operation of the filter 22 is modified so as to separate the contacted oil as a separate filtrate. The filter cake of clay is washed in situ with naphtha so as to deoil the clay. The resulting wash filtrate is separately removed and may be separately disposed of.

Thereafter, the deoiled clay is passed to the tank 25 and from there on the procedure is similar to that already described.

Obviously many modifications and variations of the invention, as hereinbefore set forth, may be made without departing from the spirit and scope thereof and therefore only such limitations should be imposed as are indicated in the appended claims.

I claim:

1. In the decolorizing of oil by contact with a decolorizing earth wherein the earth containing coloring matter extracted from the oil is removed for reactivation involving treatment with a color solvent capable of extracting coloring matter from the earth and washing with naphtha prior to reuse, the reactivated clay being wet with naphtha and retaining a small amount of color solvent, the method which comprises heating a mixture of the oil and wet reactivated earth to an elevated temperature at which coloring matter contained in the oil is extracted by the earth and at which naphtha and solvent vaporize from the mixture, distilling from the heated mixture a distillate consisting essentially of color solvent and naphtha, separately removing a second distillate of naphtha from said heated mixture, condensing said second distillate, cooling the remaining mixture of earth and oil, diluting the cooled mixture with said second condensed distillate, subsequently separating the earth from the cooled dilute mixture, reactivating the separated earth by successive washings, first with naphtha, then with a color solvent capable of extracting from the earth the coloring matter adsorbed from the oil and then with naphtha, the earth being contacted with the color solvent in the form of a slurry during the second mentioned washing, and returning reactivated earth wet with naphtha and retaining some color solvent to the heating treatment first mentioned.

2. The method of decolorizing oil which comprises heating a mixture of the oil and reactivated decolorizing earth in the presence of naphtha and residual color solvent to an elevated temperature for a period of time adequate to effect substantial decolorization, passing the heated mixture to an evaporating zone and there evaporating residual color solvent and some naphtha from the earth-oil mixture while said mixture remains at an active decolorizing temperature, subsequently reducing the temperature of the remaining earth-oil mixture below that at which a substantial vaporization of naphtha would occur from the mixture, diluting the cooled mixture with additional naphtha sufficient to provide a mixture from which the earth can be effectively removed by continuous filtration, separating the earth from the diluted mixture, reactivating the separated earth by subjecting it in the form of a slurry to the action of a color solvent more volatile than the oil being decolorized and capable of extracting from the earth the coloring matter removed from the oil by said earth, washing the reactivated earth with naphtha to remove a substantial part of the color solvent retained by the earth, returning the reactivated earth wet with naphtha and containing residual color solvent from the last mentioned washing treatment to the heating treatment first mentioned, and in said heating operation heating the mixture to a temperature high enough to effect the evaporation of residual color solvent by flash evaporation.

3. In a process for decolorizing oils involving treatment of the oil with decolorizing earth in the presence of naphtha wherein spent earth is removed from the oil and reactivated by washing with naphtha and a color solvent more volatile than the oil being decolorized and capable of extracting from the earth the coloring matter removed from the oil by said earth, the method comprising heating a naphtha diluted mixture of oil and reactivated earth retaining some residual color solvent to an elevated contacting temperature and for a period of time adequate to effect substantial decolorization of the oil, stripping solvent distillate containing said residual solvent from the mixture of earth and oil while the earth-oil mixture remains at a decolorizing temperature, substantially reducing the temperature of the stripped earth-oil mixture below said contacting temperature, diluting the cooled mixture with additional naphtha to provide a mixture from which the earth can be removed effectively by continuous filtration, separating the earth from the dilute mixture, subjecting the separated earth to a reactivating treatment by washing with naphtha and with a color solvent in the form of a slurry, returning the naphtha-laden reactivated earth retaining some residual color solvent to the heating treatment first mentioned and in said heating operation heating the mixture to a temperature high enough to effect the evaporation of residual color solvent by flash evaporation.

4. In the decolorizing of oil by contact with a decolorizing earth wherein the earth containing color matter extracted from the oil is removed for reactivation involving treatment with a color solvent capable of extracting coloring matter from the earth and washing with naphtha prior to re-use, the reactivated earth being wet with naphtha and retaining a small amount of color solvent, the method which comprises heating a mixture of the oil and wet reactivated earth to a contacting temperature in the range about 400 to 500° F., stripping from the heated mixture while still in the presence of the earth at a decolorizing temperature a distillate consisting essentially of color solvent and naphtha, substantially reducing the temperature of the stripped earth-oil mixture below said contacting temperature, diluting the cooled mixture with additional naphtha to provide a mixture from which the earth can be removed effectively by continuous filtration, separating the earth from the cooled dilute mixture, subjecting the separated earth to a reactivating treatment by washing with naphtha and with a color solvent in the form of a slurry, and returning the naphtha-laden reactivated earth retaining some residual color solvent to the heating treatment first mentioned.

WILLIAM P. GEE.